(12) United States Patent
Brown et al.

(10) Patent No.: US 8,836,496 B2
(45) Date of Patent: Sep. 16, 2014

(54) METHOD AND APPARATUS FOR FUEL FILLING MONITORING

(75) Inventors: Gregory P. Brown, Dearborn, MI (US); Brian Thomas Aitken, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 13/585,899

(22) Filed: Aug. 15, 2012

(65) Prior Publication Data

US 2014/0049387 A1 Feb. 20, 2014

(51) Int. Cl.
*B60Q 1/00* (2006.01)

(52) U.S. Cl.
USPC ......... 340/450.2; 340/425.5; 141/94; 141/95; 141/198

(58) Field of Classification Search
USPC .......... 340/450.2, 450, 425.5; 141/83, 94, 95, 141/192, 198; 701/33, 35, 123; 73/305, 73/309, 314
See application file for complete search history.

(56) References Cited

U.S. PATENT DOCUMENTS

| 5,670,830 | A | * | 9/1997 | Koga et al. | 307/10.1 |
| 6,502,461 | B2 | * | 1/2003 | Keller | 73/305 |
| 7,287,556 | B2 | | 10/2007 | Boyle et al. | |
| 2008/0035235 | A1 | * | 2/2008 | Kobayashi et al. | 141/94 |
| 2008/0319605 | A1 | * | 12/2008 | Davis | 701/35 |

* cited by examiner

*Primary Examiner* — Hung T. Nguyen
(74) *Attorney, Agent, or Firm* — Jennifer M. Stec; Brooks Kushman P.C.

(57) ABSTRACT

A system includes a processor and an external fuel indicator. The processor is configured to instruct powering of a digital display in response to detection that one or more power-up indicators has been satisfied. The processor is also configured to obtain fuel-related readings as a vehicle is fueled. Also, the processor is further configured to determine at least one fuel-related statistic other than a current fuel level. Further, the processor is configured to output the at least one fuel-related statistic to the external fuel indicator.

20 Claims, 4 Drawing Sheets

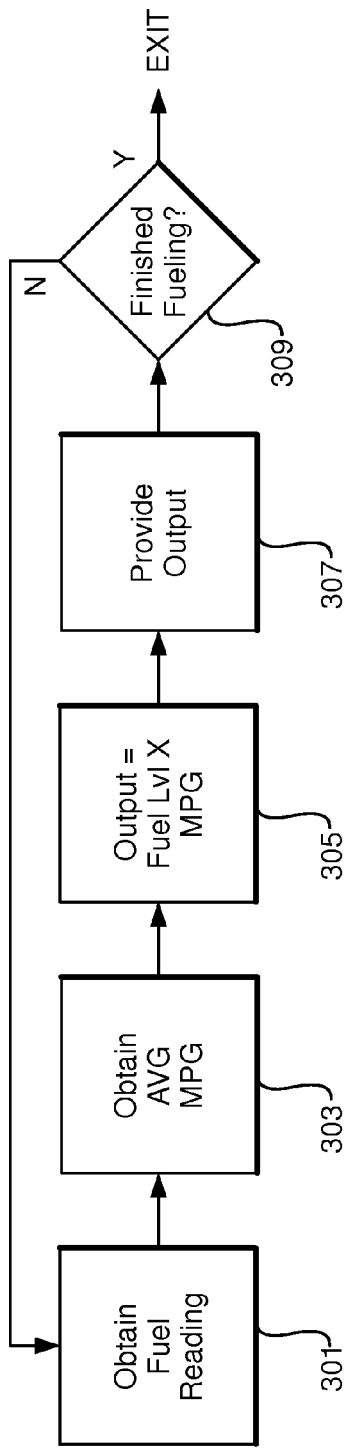
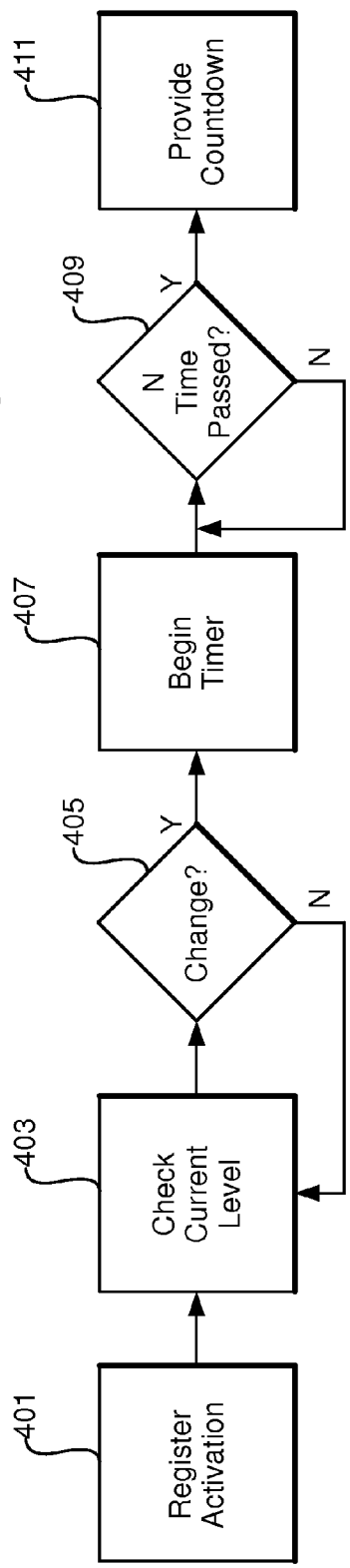

METHOD AND APPARATUS FOR FUEL FILLING MONITORING

TECHNICAL FIELD

The illustrative embodiments generally relate to methods and apparatuses for fuel filling monitoring.

BACKGROUND

Refueling vehicles is an ongoing task for drivers. Depending on resources, refueling may be done daily, weekly, or as required by a vehicle for continued travel. If a driver wishes to fill a tank, the refueling may be simple, the driver can merely add fuel until the automatic shutoff on the pump engages.

In some instances, however, the driver may have a limited amount of resources, and may only wish to add fuel to arrive at a destination. Drivers who are familiar with their cars may often know how far, for example, they can get on a half or quarter tank of gas. They may not necessarily have translated this into actual gallons of fuel in their minds, so the fuel pump readout informing a driver that five gallons have been dispensed may not be as useful as the knowledge that the tank is now one half full.

Some attempts have been made to address this. For example, U.S. Pat. No. 7,287,556 describes a fuel level indicator indicating a fuel level in a vehicle fuel tank and disposed proximate a cap for closing a refueling orifice extending from the fuel tank. The fuel indicator indicates the fuel level in response to a fuel level sender unit disposed in the fuel tank. According to one embodiment, the fuel level sender unit supplies fuel level information to both a dashboard-mounted gauge and the cap-proximate fuel indicator. A switch supplies power to the cap-proximate fuel indicator and the fuel level sender unit, without powering on other watercraft systems.

SUMMARY

In a first illustrative embodiment, a system includes a processor and an external fuel indicator. The processor is configured to instruct powering of a digital display in response to detection that one or more power-up indicators has been satisfied. The processor is also configured to obtain fuel-related readings as a vehicle is fueled. Also, the processor is further configured to determine at least one fuel-related statistic other than a current fuel level. Further, the processor is configured to output the at least one fuel-related statistic to the external fuel indicator.

In a second illustrative embodiment, a computer-implemented method includes powering of a digital display in response to detection that one or more power-up indicators has been satisfied. The method further includes obtaining fuel-related readings as a vehicle is fueled. Further, the method includes determining, via a vehicle computing system, at least one fuel-related statistic other than a current fuel level. The method also includes outputting the at least one fuel-related statistic to the external fuel indicator.

In a third illustrative embodiment, a tangible computer-readable storage medium, stores instructions that, when executed by a processor, cause the processor to perform the method including powering of a digital display in response to detection that one or more power-up indicators has been satisfied. The method also includes obtaining fuel-related readings as a vehicle is fueled. Further, the method includes determining, via a vehicle computing system, at least one fuel-related statistic other than a current fuel level. The method also includes outputting the at least one fuel-related statistic to the external fuel indicator.

BRIEF DESCRIPTION OF THE DRAWINGS

FIG. 3 shows an illustrative example of a process for outputting fuel information;

FIG. 4 shows an illustrative example of a process for outputting fueling information.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
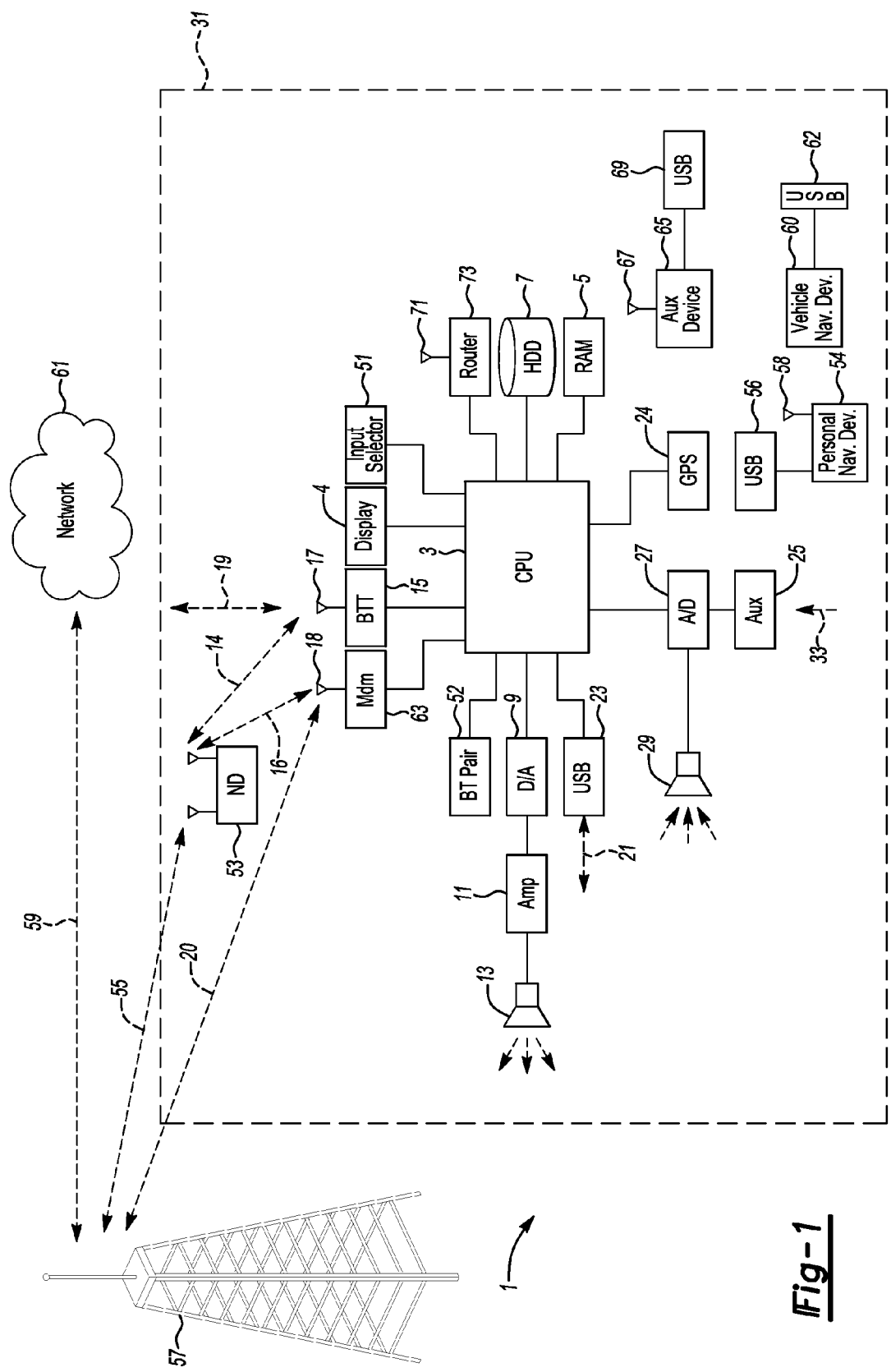
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Unless a driver wishes to fully fuel a vehicle, while filling up the vehicle the driver may have some desire to know what a fuel level is. One possible way of doing this would be to power the vehicle, but this requires the driver to then look inside the vehicle while fueling, and, in many vehicles, the interior fuel cluster does not immediately display a current fuel level.

Customers who wish to be "green" and also want to maximize refueling will often stop fueling after one "click" of the automatic shutoff. This can help prevent the release of fumes, and the spillage of fuel from an overfull tank. While this approach may generally work, in some instances, due to, for example, faulty automatic shutoff sensors in a gas pump, this may result in a vehicle that is not as full as a customer expected. A customer then expecting a full tank of fuel may discover that the tank is still empty to some extent.

The false-stop situation can occasionally present a problem with respect to rental cars. Drivers of these cars may be in somewhat of a hurry, and may stop proximate to an airport to refuel the vehicle. Since the car will only be driven to the airport following the refueling, the "one click" stop of fueling is a common means of determining when to cease fueling the rental car. This would generally be fine, but if a false-stop occurs, the driver may not realize that the vehicle is not full until the drive to the airport has begun and the fuel cluster updates. In such an instance, the driver may have no choice but to pay the rental company the more expensive price for gas that the company charges, as time may be tight.

The illustrative embodiments provide a mechanism through which a customer can view a fuel status while refilling the vehicle. Since a digital readout can be provided, a variety of useful information about a fuel state of the vehicle can be provided.

Figure 2:
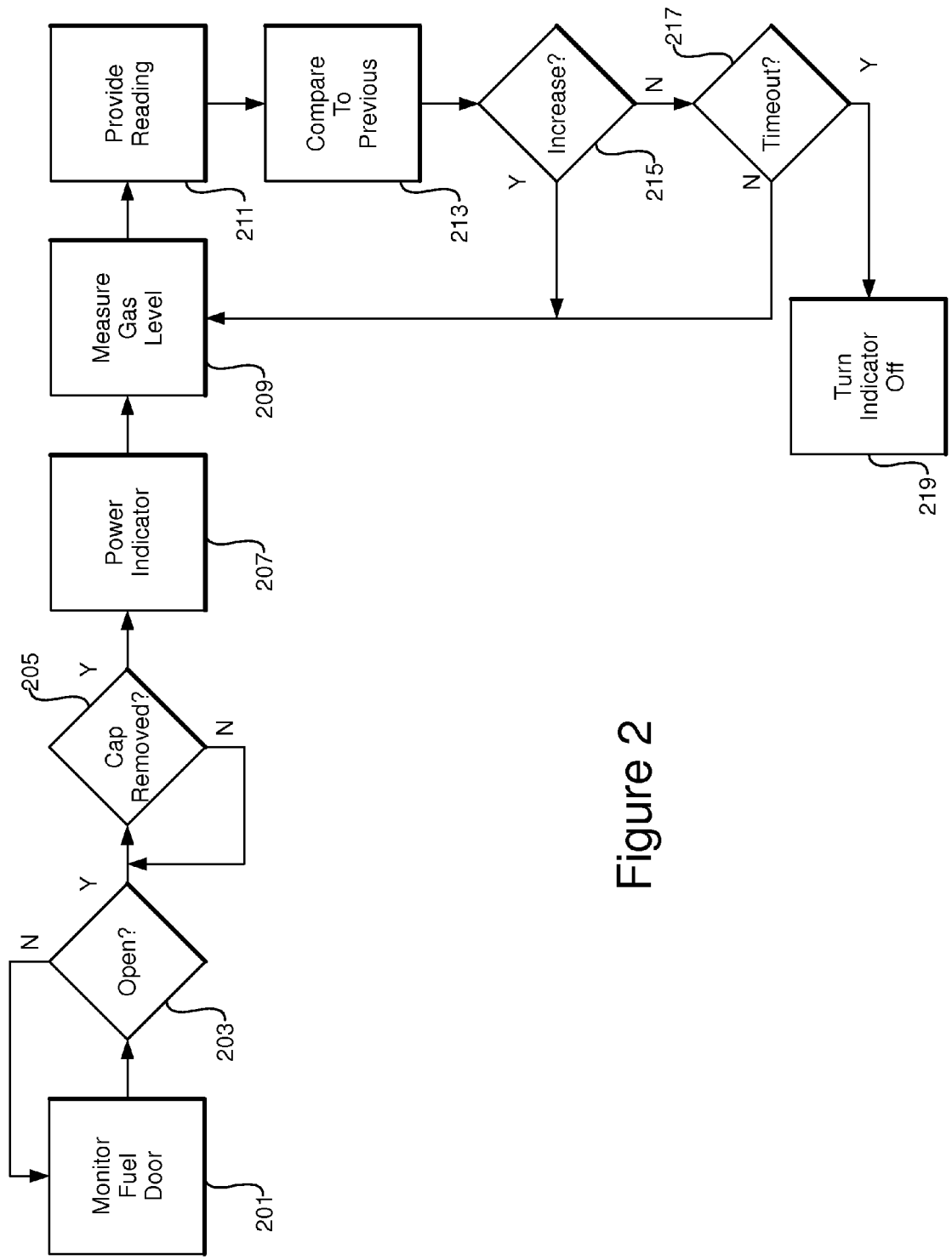
FIG. 2 shows an illustrative example of a process for enabling and outputting to a fuel level indicator.

FIG. 2 shows an illustrative example of a process for enabling and outputting to a fuel level indicator. In this illustrative embodiment, the display next to the tank is not always powered, but is desired to be powered when one or more conditions has been met. For example, in one illustrative embodiment, a display process monitors the fuel door 201 to see if the door has been opened 203. The fuel door is the door covering the gas tank, and is sometimes manually opened and sometimes electrically or mechanically released for opening.

Once the fuel door has been opened 203, the process may check for some secondary indicia that fueling is about to begin. Since a fuel door, especially ones without a locking mechanism, may be left open or become open, it may be desirable to determine that refueling is about to begin before enabling the display. This could be indicated, for example, by detecting removal of a fuel cap 205, insertion of a gas pump (not shown), or any other suitable secondary indicia. Alternatively, simply opening the fuel door may be sufficient to power the display. In some examples, a capless insert is used in place of a fuel cap.

Until the secondary indicia has been detected, in this process, the indicator remains unpowered. Once the secondary indicia has been detected, the process powers the indicator 207. The indicator can be a simple fuel gauge or, as will be discussed with respect to FIGS. 5A-5D, can be a digital display providing various information about a fuel state. In this illustrative example, the indicator provides a fuel state, at a minimum.

The process measures a current fuel level 209 and then provides a reading for the operator at the visual indicator 211. Also, in this example, an automatic shutoff is provided. In this case, the system shuts off once a certain amount of time has passed in which a fuel level has not changed. Accordingly, after presenting the output, in this example, the process compares a current measured level to a previously measured (i.e., a second or a few seconds before) level 213. If there is an increase in the level 215, the fueling process must be ongoing, so the measurement and presentation continues.

If there is not an increase in the levels, the process determines if a timeout time period has passed since the process stopped 217. If the timeout period has not passed, measurement and presentation can continue (e.g., the user may have briefly unclenched their hand on the nozzle). If the timeout period has passed, the process will disable the exterior indicator 219.

In another example, reversal of the conditions for power-up of the display can result in power-down of the display. For example, if the process didn't power the display until a fuel door was open and a fuel cap was removed, replacement of the fuel cap and closure of the fuel door could result in power-down of the display.

FIG. 3 shows an illustrative example of a process for outputting fuel information. In this illustrative example, an outside display capable of dynamically displaying useful information is contemplated. A small LED, LCD or other suitable display could be used to show a variety of information relating to a fuel state. This process will demonstrate how a vehicle could display a current travelable distance to a driver.

Often times a driver will have insufficient time or money to fully fuel a vehicle, especially if the vehicle is driven infrequently and the excess fuel will be of little use to the driver until some much later date. In such a case, the driver may only wish to put enough fuel into a vehicle to get to a destination, or to get them through a weekend, etc. If, for example, a driver is running late in the morning, the driver may only want to stop for enough gas to get to work, and worry about finishing the fueling later.

In such a case, the driver may wish to know approximately how far a vehicle can travel on a current fuel load. Accordingly, in this example, the process will obtain a current fuel reading indicating a fuel level of the vehicle's tank 301. In conjunction with this reading, the process may check a current average MPG for a vehicle 303. Many modern vehicles store average MPG information for the life of a vehicle, or even for a current trip. In some instances, where a vehicle has multiple drivers, MPG information can even be stored on a driver-by-driver basis. This information can be accessed by the vehicle computing system and multiplied times the current fuel level 305 to produce an estimated travelable distance on a current fuel load.

This distance can then be output to a user 307. By having access to this information at the pump, the user can determine if the time/cost of additional fuel is worth it, and can proceed accordingly. If the fueling process has not finished 309, then the process can continue to obtain and output fuel readings. Once the process completes, a final fuel reading will be known and a user can have a reasonable estimate of how far a vehicle can travel.

In at least one illustrative embodiment, not shown, a vehicle computing system may have route information input therein. By using the current route (and know parameters such as traffic, speed, etc.), the process can even more accurately guess as to whether or not a vehicle can successfully travel to a destination (or to a destination and back, if desired). In such a case, weather, traffic, speed limits, etc., could be considered in providing an indicia to a driver that sufficient fuel has been obtained to reach a destination. If such an estimate were performed, it may be desirable to build in a reasonable buffer as well, to ensure that the prediction was fairly accurate in most cases.

FIG. 4 shows an illustrative example of a process for outputting fueling information. In this illustrative example, the process provides additional information, in this case, relating to an estimated time to complete fueling. Although it seems like the 5-10 minute process of refueling a vehicle can easily be planned and accounted for, there are numerous instances where a driver is pressed for time and thus forced to make a decision about how much fuel to put into a vehicle at one stop. For example, if racing to catch a flight, a rental driver may estimate that they have 2-3 minutes to fuel a vehicle. Some daycare services charge by the minute for late pickups, and parents may wish to determine whether time to refuel is possible before picking up the kids from daycare.

If the pump happens to be a slow pump, refueling could take 10 minutes or even more, and a driver could consequently be late for a flight. If the driver had an idea of how much time refueling would take, the driver could estimate the reasonableness of waiting until the tank is full. In another example, this information can be used in conjunction with a travelable distance so that, for example, a driver can know when a desired destination can be reached, and then determine if the amount of time required for finishing fueling is worth the wait.

In still another example, the driver may wish to go, for example, to a destination or 100 miles. Inputting information beforehand (or using existing information already input), the process can determine how much time remains before a desired fuel level (e.g., other than full) will be reached.

In this illustrative process, the process first registers that the fuel indicator has been activated 401. This can serve as a trigger for outputting a time-remaining to full. The process then checks a current fuel level 403 and then determines if a change to fuel level has occurred 405. Until a change occurs, the process will not be able to measure a refueling rate, so it will be difficult, if not impossible, to determine how long refueling will take.

Once a change has begun 405, the process can begin a timer 407 and measure the rate of fuel added versus time that has passed. Once a sufficient amount of time has passed 409, the process can provide a fair estimate of a remaining required time to complete fueling a vehicle, and output that information to a display 411.

In at least one embodiment, the process may also save the refueling rate in conjunction with a gas station location (as discovered, for example, by a GPS location). In such an instance, when the driver arrives at the same location at a later date, the system can, either by request or automatically, inform the driver the approximate time for refueling at this location, based on a current fuel level. This, of course, assumes that gas pumps operate at a relatively consistent rate at the same station. Even if the pump rate varies somewhat, however, aggregated information can tend to indicate a reasonable estimate of refueling time for a particular station.

In another embodiment, the refueling speed information can be stored remotely in a cloud-based service and compared with information gathered by other drivers, so that refueling times, even at a station to which the driver has never been, may be estimated.

Figure 5A:
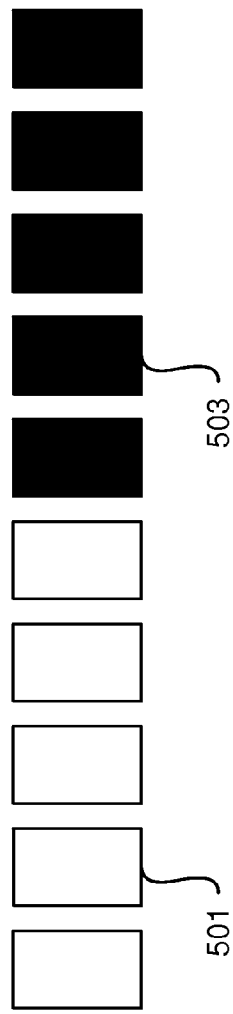
FIGS. 5A-5D shows illustrative examples of displays.
Figure 5B:
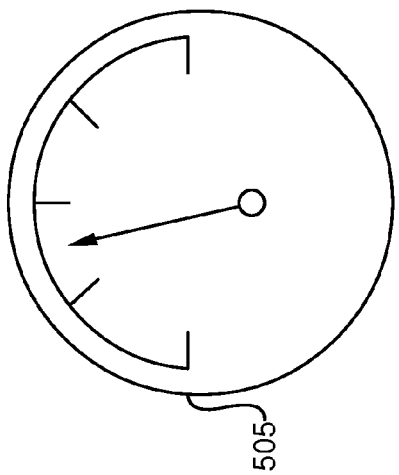

FIGS. 5A-5D shows illustrative examples of displays. FIG. 5A shows a display of LED or other lights which are dark 501 when a fuel level is below a certain point and light up 503 as fuel is put into the vehicle. FIG. 5B shows an example of a traditional fuel display that could be provided on the outside of a vehicle, whether it be a mechanical dial 505 or a digital display of a dial.

Figure 5C:
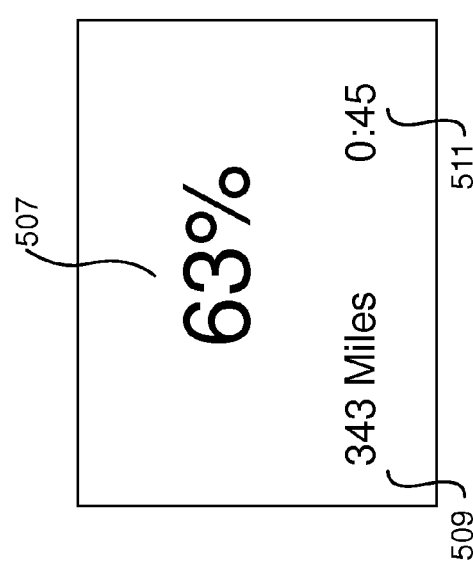

FIG. 5C shows an illustrative example of a digital display, capable of providing a variety of information relating to a fuel level. For example, one piece of information can show a full-percentage of the tank 507. As fuel is added, this percentage can increase. In another example, the display can show a total travelable distance 509. This distance presumably increases as fuel is added to a vehicle.

Also shown in this example is a remaining time until the tank is full 511. This information is just some of the information available to a user. In one example, if the vehicle computing system controlling the display was capable of knowing (through web-based or locally broadcast information) the current fuel price, it could show, for example, the cost to finish filling a tank, or to finish filling a tank to a desired level.

This information could be useful to someone who only had $20. They could determine if they could fill the tank to a certain level, while still leaving money for, for example, lunch. With the rising prices of fuel, such considerations are more commonplace than they used to be years ago.

Figure 5D:
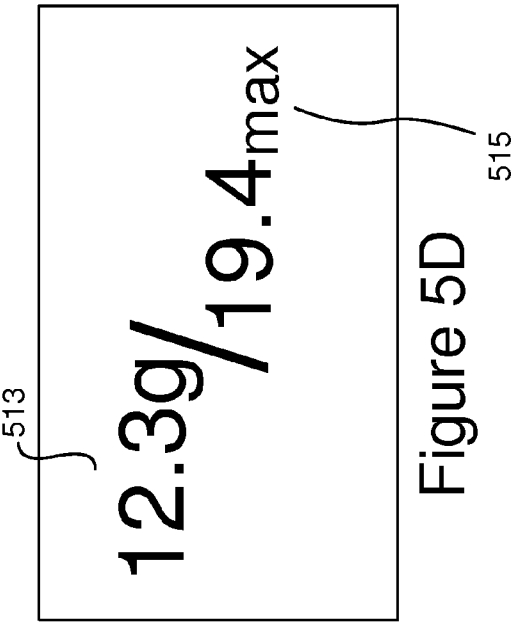

FIG. 5D shows an illustrative example of yet another digital display, wherein a total amount of fuel 513 is shown as a ratio over a total tank size 515. As noted, a variety of useful information relating to vehicle refueling can be obtained through the use of the exterior display. If, for example, a vehicle were rented with X amount of fuel in the tank, the driver may wish to put X+ enough to travel the distance to the airport from the refueling stop back into the vehicle before returning the vehicle. Digital readouts can make this much less of a guessing-game for drivers, and may result in increased requests for vehicles equipped with such technology.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor; and
an external fuel indicator,
wherein the processor is configured to instruct powering of a digital display in response to detection that one or more power-up indicators has been satisfied, obtain fuel-related readings as a vehicle is fueled, determine at least one fuel-related statistic other than a current fuel level, and output the at least one fuel-related statistic to the external fuel indicator.

2. The system of claim 1, wherein the fuel-related statistic is an amount of time until a vehicle tank has reached a desired level.

3. The system of claim 2, wherein the desired level is "full".

4. The system of claim 1, wherein the fuel-related statistic is a total travelable distance on a current fuel amount.

5. The system of claim 1, wherein the fuel-related statistic is an indicia of whether a previously input destination can be reached on a current fuel amount.

6. The system of claim 1, wherein the processor is further configured to retrieve a current GPS location, retrieve fuel information relating to a service station located at the current GPS location, utilize the fuel information to provide estimates of at least one fuel related statistic and present the estimates to a driver upon arriving and stopping at the service station.

7. The system of claim 6, wherein the fuel related statistic is an estimated time to refuel.

8. A computer-implemented method comprising:
powering of a digital display external fuel indicator in response to detection that one or more power-up indicators has been satisfied;
obtaining fuel-related readings as a vehicle is fueled;

determining, via a vehicle computing system, at least one fuel-related statistic other than a current fuel level; and outputting the at least one fuel-related statistic to the digital display external fuel indicator.

9. The method of claim 8, wherein the fuel-related statistic is an amount of time until a vehicle tank has reached a desired level.

10. The method of claim 9, wherein the desired level is "full".

11. The method of claim 8, wherein the fuel-related statistic is a total travelable distance on a current fuel amount.

12. The method of claim 8, wherein the fuel-related statistic is an indicia of whether a previously input destination can be reached on a current fuel amount.

13. The method of claim 8, further comprising:
retrieving a current GPS location;
retrieving fuel information relating to a service station located at the current GPS location;
utilizing the fuel information to provide estimates of at least one fuel related statistic; and
presenting the estimates to a driver upon arriving and stopping at the service station.

14. The method of claim 13, wherein the fuel related statistic is an estimated time to refuel.

15. A tangible computer-readable storage medium, storing instructions that, when executed by a processor, cause the processor to perform the method comprising:
powering of a digital display external fuel indicator in response to detection that one or more power-up indicators has been satisfied;
obtaining fuel-related readings as a vehicle is fueled;
determining, via a vehicle computing system, at least one fuel-related statistic other than a current fuel level; and
outputting the at least one fuel-related statistic to the digital display external fuel indicator.

16. The storage medium of claim 15, wherein the fuel-related statistic is an amount of time until a vehicle tank has reached a desired level.

17. The storage medium of claim 15, wherein the fuel-related statistic is a total travelable distance on a current fuel amount.

18. The storage medium of claim 15, wherein the fuel-related statistic is an indicia of whether a previously input destination can be reached on a current fuel amount.

19. The storage medium of claim 15, further comprising:
retrieving a current GPS location;
retrieving fuel information relating to a service station located at the current GPS location;
utilizing the fuel information to provide estimates of at least one fuel related statistic; and
presenting the estimates to a driver upon arriving and stopping at the service station.

20. The storage medium of claim 19, wherein the fuel related statistic is an estimated time to refuel.

\* \* \* \* \*